United States Patent [19]

Miyazawa

[11] Patent Number: 4,827,388

[45] Date of Patent: May 2, 1989

[54] DUAL PURPOSE LAMP ASSEMBLY OF IMPROVED LIGHT DISTRIBUTION FOR USE, FOR EXAMPLE, AS A COMBINED FOG AND CORNERING LAMP ON A MOTOR VEHICLE

[75] Inventor: Kenji Miyazawa, Shimizu, Japan

[73] Assignee: Koito Seisakusho Co., Ltd., Tokyo, Japan

[21] Appl. No.: 206,366

[22] Filed: Jun. 14, 1988

[30] Foreign Application Priority Data

Feb. 8, 1988 [JP] Japan .................................. 63-26969

[51] Int. Cl.⁴ .............................................. B60Q 1/08
[52] U.S. Cl. ...................................... 362/284; 362/61; 362/282; 362/322; 362/324
[58] Field of Search ........................ 362/37, 61, 80, 66, 362/70, 277, 280, 304, 307, 310, 346, 322, 323, 324, 282, 284

[56] References Cited

U.S. PATENT DOCUMENTS

| | | | |
|---|---|---|---|
| 1,305,498 | 6/1919 | Schroeder | 362/284 X |
| 1,314,034 | 8/1919 | Winston | 362/284 |
| 1,632,127 | 6/1927 | Goodstein | 362/284 |
| 4,663,696 | 5/1987 | Miyazawa et al. | 362/80 |

Primary Examiner—Stephen F. Husar
Attorney, Agent, or Firm—Browdy & Neimark

[57] ABSTRACT

A lamp assembly capable of functioning both as fog lamp and cornering lamp on a motor vehicle, comprising a fixed reflector within a housing, a movable reflector positioned forwardly of the fixed reflector, and a light bulb mounted to the fixed reflector via a bulb holder, with the bulb holder extending forwardly from the fixed reflector through an aperture in the movable reflector. The fixed reflector reflects the light rays from the bulb in the forward direction of the lamp assembly. Less in size then the fixed reflector, the movable reflector pivots about a vertical axis between a first position, where it coacts with the fixed reflector to reflect the light rays forwardly in the use of the lamp assembly as fog lamp, and a second position where the movable reflector deflects part of the light rays toward one side of the lamp assembly to enable the same to serve as cornering lamp. The bulb holder has a constricted neck for receiving part of the movable reflector as the latter pivots from the fog lamp position to the cornering lamp position, so that the horizontal dimension of the aperture in the movable reflector can be reduced to a minimum without interfering with the pivotal motion of the movable reflector.

4 Claims, 7 Drawing Sheets

DUAL PURPOSE LAMP ASSEMBLY OF IMPROVED LIGHT DISTRIBUTION FOR USE, FOR EXAMPLE, AS A COMBINED FOG AND CORNERING LAMP ON A MOTOR VEHICLE

CROSS REFERENCE TO RELATED APPLICATION

An application Ser. No. 07/206,368 pending entitled "Dual Purpose Lamp Assembly for Use, for Example, as a Combined Fog and Cornering Lamp on a Motor Vehicle" is filed substantially concurrently herewith by the same applicant and assigned to the assignee of the instant application.

BACKGROUND OF THE INVENTION

This invention relates to electric lamps and particularly to a lamp assembly capable of throwing beams of light in either one or two different directions as required. Such a dual purpose lamp assembly lends itself to use as, typically, an integral combination of a fog lamp and a cornering lamp on a motor vehicle. More particularly, the invention concerns improvements in such dual purpose lamp assemblies of the type described and claimed in the above cross referenced application, which in turn is an improvement of Miyazawa et al. U.S. Pat. No. 4,663,696.

The dual purpose lamp assembly according to the noted U.S. patent comprises a relatively large fixed reflector, a movable reflector of smaller size positioned forwardly of the fixed reflector for pivotal motion about a vertical axis, and a light bulb having a filament disposed at the common focus of the fixed and movable reflectors. The movable reflector pivots between a first position, where it coacts with the fixed reflector for reflecting the light rays from the bulb forwardly of the lamp assembly, and a second position where the movable reflector reflects part of the light rays from the bulb toward either side of the lamp assembly. Thus the lamp assembly functions as fog lamp when the movable reflector is in the first position, providing road illumination forwardly of the motor vehicle. Upon displacement of the movable reflector to the second position, on the other hand, the lamp assembly serves the additional purpose of cornering lamp to supplement the vehicle headlamp system by providing additional illumination in the direction of a vehicle turn.

This prior art dual purpose lamp assembly has proved to have weaknesses arising from its mechanical construction. Being positioned upstandingly in front of the fixed and movable reflectors, the elongate stem, in particular, of the light bulb inevitably intercepts part of the light rays that have been reflected from the movable reflector. Accordingly, the complete light energy emitted by the bulb has not been utilized for the intended purposes.

In order to solve this problem, the above cross referenced application suggests that the light bulb be coaxially mounted to the fixed reflector via a bulb holder so as to extend forwardly therefrom through an aperture in the movable reflector. So arranged, the light bulb with its stem presents no substantial obstacle to the reflected rays. This solution has proved to have its own drawback, however. Although the vertical dimension of the aperture can be only slightly more than the bulb holder which extends therethrough, its horizontal dimension must be much longer to permit the angular displacement, about the vertical axis, of the movable reflector between the two working positions without interference with the bulb holder. Such a large aperture reduces the reflective surface area of the movable reflector and so makes it impossible to provide illumination of desired intensity distribution.

SUMMARY OF THE INVENTION

The present invention provides a truly satisfactory solution to the problem of how to improve the light distributions of the dual purpose lamp assemblies of the type specified, without the inconveniences encountered heretofore.

In summary the invention concerns a dual purpose lamp assembly comprising a fixed reflector oriented forwardly of the lamp assembly, a light bulb mounted to the fixed reflector via a bulb holder and extending forwardly therefrom, and a movable reflector disposed forwardly of the fixed reflector and having an aperture formed therein to permit the bulb holder to extend therethrough so that the light bulb is positioned forwardly of the movable reflector. The movable reflector is pivotable about a predetermined axis relative to the fixed reflector between a first position, where the movable reflector coacts with the fixed reflector for reflecting the light rays from the bulb forwardly of the lamp assembly, and a second position where the movable reflector reflects part of the light rays from the bulb toward one side of the lamp assembly. The bulb holder has a constricted neck for receiving part of the movable reflector as the latter pivots between the first and second positions.

Thus the movable reflector is partly received in the constricted neck of the bulb holder on being pivoted from the first toward the second position. Consequently, the dimension of the aperture in the movable reflector can be reduced to a minimum in a direction at right angles with the predetermined axis without interfering with the pivotal motion of the movable reflector through a required angle. The area of the reflective surface of the movable reflector can thus be made much larger than in the prior art.

The above and other features and advantages of this invention and the manner of realizing them will become more apparent, and the invention itself will best be understood, from a study of the following description and appended claims, with reference had to the attahed drawings showing some preferable embodiments of the invention.

DESCRIPTION OF THE PREFERRED EMBODIMENT

General

The illustrated dual purpose lamp assembly represents an adaption of the invention for use on a motor vehicle as a combined fog and cornering lamp, to be installed on either side of the vehicle only with a minimum modification of construction. The general organization of the combined fog and cornering lamp assembly will become apparent from an inspection of FIG. 1–5. Generally designated 10, the lamp assembly broadly comprises:

1. A lamp housing 12 in the form of a box having an open front end closed by a lens 14.
2. A fixed reflector 16 immovably mounted within the housing 12 and oriented forwardly, shown directed to the bottom in FIGS. 1 and 3, of the lamp assembly 10.
3. A substantially tubular bulb holder 18 coaxially mounted to the fixed reflector 16.
4. A light bulb 20 supported by the bulb holder 18 and extending forwardly therefrom.
5. A movable reflector 22 disposed forwardly of the fixed reflector 16 and pivotable between a first or fog lamp position, where the movable reflector coacts with the fixed reflector 16 for reflecting the light rays from the bulb 20 forwardly of the lamp assembly 10, and a second or cornering lamp position angularly offset from the fog lamp position toward either side of the lamp assembly, where the movable reflector angles part of the light rays from the bulb toward that side of the lamp assembly.
6. A drive mechanism 24 mounted within the lamp housing 12 and mostly disposed behind the fixed reflector 16 for driving the movable reflector 22 between the fog lamp position and either of the two possible cornering lamp positions.

The following is a more detailed discussion of the listed components of the combined fog and cornering lamp assembly 10.

Lamp Housing

With reference to FIGS. 1–4 the lamp housing 12 is in the form of a box, rather elongated horizontally and opening forwardly. The front edges of the lamp housing 12 have L shaped flanges 26 defining a continuous groove 28. The lens 14 has a thickened peripheral rim 30 with a tongue 32 adapted to fit in the groove 28 in the lamp housing 12. A suitable adhesive may be employed for securing the lens 14 to the lamp housing 12.

Fixed Reflector

Figure 2:
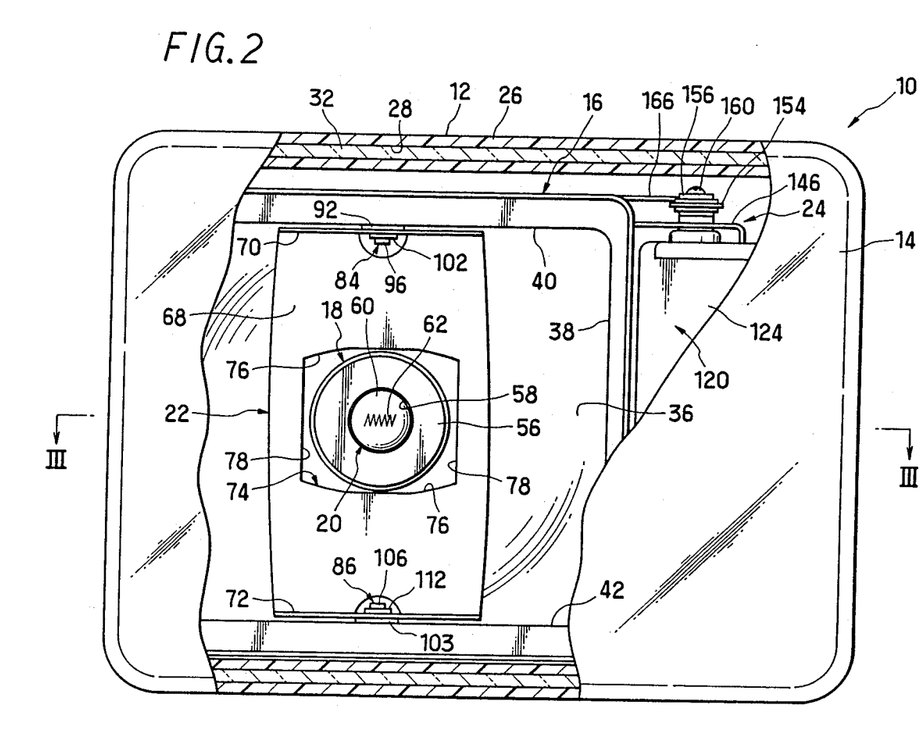
FIG. 2 is a front elevation of the lamp assembly of FIG. 1, with the housing also shown broken away to reveal the contained parts.
Figure 3:
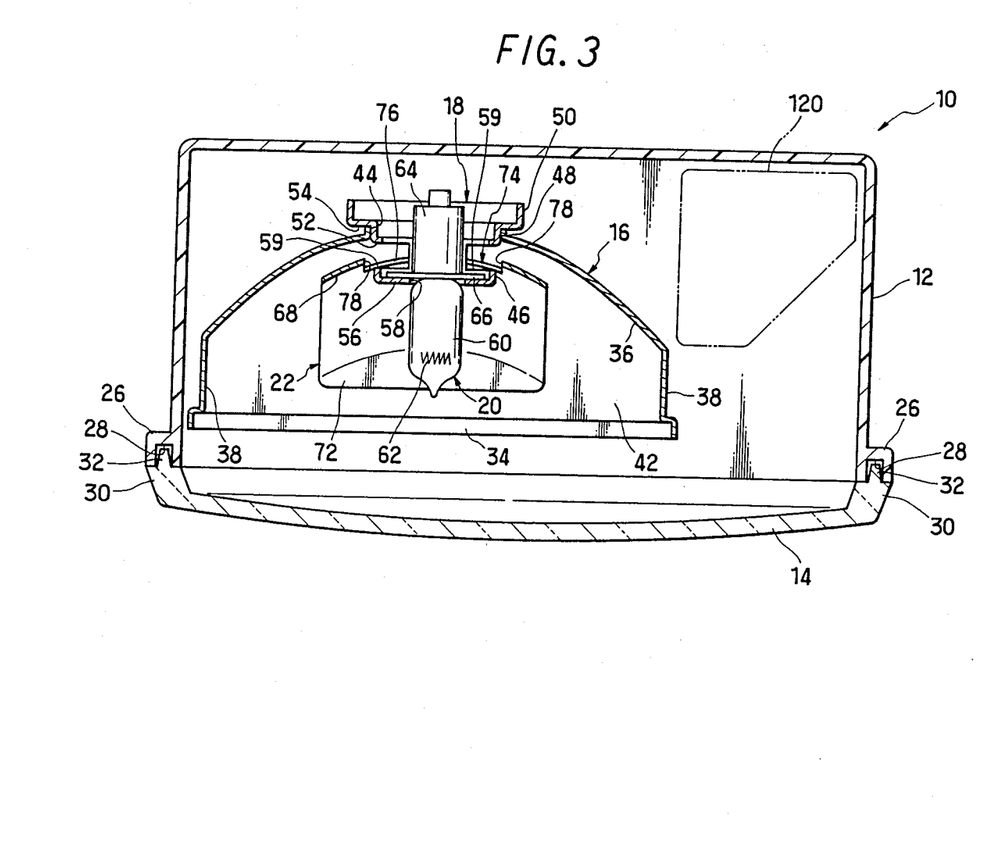
FIG. 3 is a horizontal section through the lamp assembly, taken along the line III—III in FIG. 2.
Figure 4:
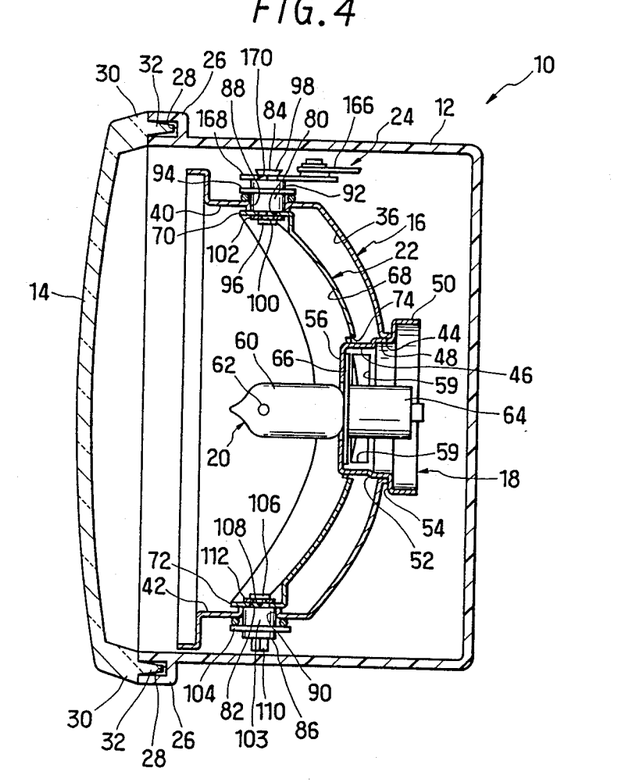
FIG. 4 is a vertical section through the lamp assembly, taken along the line IV—IV in FIG. 1.

As will be noted from FIGS. 2–4 in particular, the fixed reflector 16 comprises a rectangular frame portion 34 disposed immediately behind the lens 14, and a reflective portion 36 displaced rearwardly of the frame portion. The frame portion 34 and reflective portion 36 are joined to each other via a pair of flat side portions 38, a flat top portion 40 and a flat bottom portion 42. All the listed parts of the fixed reflector 16 can be a one piece pressing of sheet metal, with at least the front face of the reflective portion 36 rendered reflective as by the vapor deposition of aluminum.

The reflective portion 36 is in the shape of a paraboloid of revolution; that is, the fixed reflector 16 is a paraboloidal reflector. The axis of this paraboloidal reflector consitutes the optical axis of the lamp assembly 10. A hole 44 is formed centrally in the reflective portion 36 for mounting the light bulb 20 to the fixed reflector 16 via the bulb holder 18 in a manner set forth subsequently.

Bulb Holder

Reference may be had to FIGS. 2–5 for the detailed consideration of the bulb holder 18. The bulb holder 18 has three concentric tubular portions 46, 48 and 50 of different diameters, providing two shoulders 52 and 54 therebetween. While the rear end of the bulb holder is open, it front end is closed by an end plate 56. An aperture 58 is formed in the end plate 56 for use in mounting the light bulb 20.

FIGS. 3 and 4 indicate that the bulb holder 18 is inserted, with its minimum diameter portion 46 foremost, in and through the hole 44 in the fixed reflector 16 from its rear side until the shoulder 54 of the bulb holder comes into abutment against the reflective portion 36 of the fixed reflector, with the middle portion 48 closely engaged in the hole 44. The bulb holder 18 is suitably secured to the fixed reflector 16 in their relative positions specified.

Figure 5:
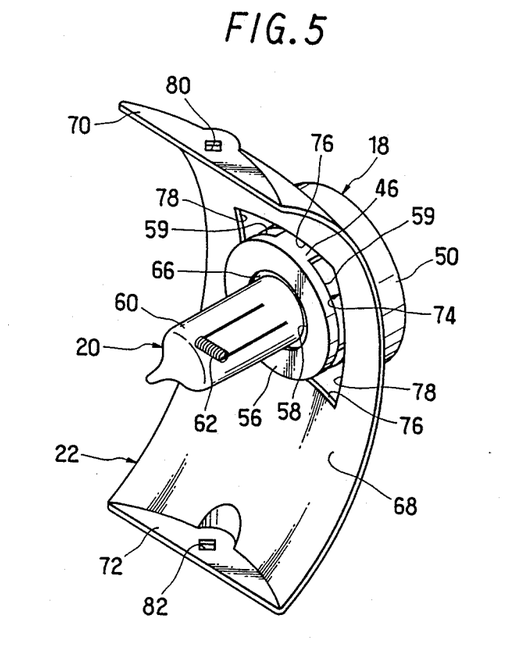
FIG. 5 is a perspective view showing the light bulb, bulb holder, and movable reflector of the lamp assembly.

As will be noted from FIGS. 3 and 5 in particular, all but the top and bottom portions of the foremost tubular portion 46 of the bulb holder 18 is cut away to provide a pair of recesses 59 in diametrically opposed relation to each other. The pair of recesses 59 serves to create a constricted neck in the bulb holder 18 for the purposes that will become apparent as the description progresses.

Light Bulb

As shown also in FIGS. 2–5, the light bulb 20 can be of the familiar single filament type, comprising an envelope 60 of vitreous material, with a filament 62 enclosed therein, and a stem 64 having a mounting flange 66 formed thereon. This light bulb 20 can be mounted to the bulb holder 18 by being inserted, with its envelope 60 foremost, in and through the aperture 58 in the end plate 56 of the bulb holder until the mounting flange 66 on the bulb stem 64 comes to butt on the rear surface of the end plate. So positioned with respect to the bulb holder 18, the bulb 20 can be retained in position as suitable retaining means, not shown, urges the bulb mounting flange 66 against the bulb holder end plate 56. It will be seen from FIGS. 3 and 4 that the pair of recesses 59 in the bulb holder 18 are located just behind the bulb mounting flange 66.

Now the light bulb 20 has been mounted to the fixed reflector 16 via the bulb holder 18 in alignment about the lamp axis. The midportion of the bulb filament 62 is at the common focus of the fixed reflector 16 and movable reflector 22.

Movable Reflector

With reference directed also to FIGS. 2–5, the movable reflector 22 comprises a reflective portion 68 which is substantially rectangular in shape and elongated vertically as seen in a front view as in FIG. 2, and a pair of mounting flanges 70 and 72 extending forwardly from the top and bottom ends of the reflective portion. The horizontal dimension of the reflective portion 68 is about one third of that of the reflective portion 36 of the fixed reflector 16. The front surface of the reflective portion 72 is in the shape of a paraboloid of revolution, centered about an axis that is aligned with the fixed reflector axis when the movable reflector 22 is in the fog lamp position as in FIGS. 2–4.

Formed in the reflective portion 68 of the movable reflector 22 is an aperture 74 for permitting the light bulb 20, as well as the foremost tubular portion 46 of the bulb holder 18, to extend forwardly therethrough with clearance. As best seen in FIG. 2, the aperture 74 is approximately rectangular in shape, being defined by a pair of opposed horizontal edges 76 and a pair of opposed vertical edges 78. The distance between the pair of horizontal edges 76 is slightly more than the diameter of the foremost tubular portion 46 of the bulb holder 18. The distance between the pair of vertical edges 78 is slightly more than that between the pair of horizontal edges 76 in order to allow for the angular displacement of the movable reflector 22 between the two extreme positions (cornering lamp positions) to be explained hereafter.

The top and bottom mounting flanges 70 and 72 of the movable reflector 22 have square shaped openings 80 and 82, FIGS. 4 and 5, formed centrally therein. Nonrotatably received in these openings 80 and 82 are pivot pins 84 and 86 in vertical alignment with each other. These pivot pins further rotatably extend through holes 88 and 90, respectively, which are formed in the flat top and bottom portions 40 and 42 of the fixed reflector 16. Thus the movable reflector 22 is pivotable about the aligned vertical axis of the pivot pins 84 and 86.

As clearly shown in FIG. 4, the upper pivot pin 84 has a cylindrical portion 92 which is rotatably received in the hole 88 in the fixed reflector top portion 40 and which has a collar 94 formed thereon in overlying relation to the fixed reflector top portion. The cylindrical portion 92 has a downward extension 96 of square shaped cross section closely received in the opening 80 in the movable reflector top flange 70, and an upward extension 98 of polygonal cross section for connection to the drive mechanism 24. The downward extension 96 is grooved at 100.

In pivotally mounting the movable reflector 22 to the fixed reflector 16, the upper pivot pin 84 of the foregoing construction may be inserted, with its extension 96 foremost, in and through the hole 88 in the fixed reflector top portion 40 from above, until the downward extension 96 becomes nonrotatably received in the opening 80 in the movable reflector top flange 70. The cylindrical portion 92 of the upper pivot pin 84 will then be rotatably received in the hole 88. A retainer ring 102 may then be fitted in the groove 100 in the pivot pin downward extension 96 to retain the upper pivot pin 84 in position against accidental detachment.

The lower pivot pin 86 is shown to be identical in construction with the upper pivot pin 84 except that it is placed upside down. Thus the lower pivot pin 86 comprises a cylindrical portion 103 with a collar 104 formed thereon, an upward extension 106 of square shaped cross section having a groove 108, and a downward extension 110. The cylindrical portion 103 rotatbly extends through the hole 90 in the fixed reflector bottom portion 42, with the collar 104 underlying the fixed reflector bottom portion. The upward extension 106 is nonrotatably engaged in the opening 82 in the movable reflector bottom flange 72. A retainer ring 112 is engaged in the groove 108 in the upward extension 106 thereby locking the lower pivot pin 86 in place. The downward extension 110 of the lower pivot pin 86 serves no useful purpose in this embodiment.

Thus the movable reflector 22 is supported between the top and bottom portions 40 and 42 of the fixed reflector 16 for angular displacement about the common vertical axis of the pair of pivot pins 84 and 86. This vertical axis passes the focal point of the movable reflector 22, at which point is located the filament 62 of the light bulb 20.

Figure 6:
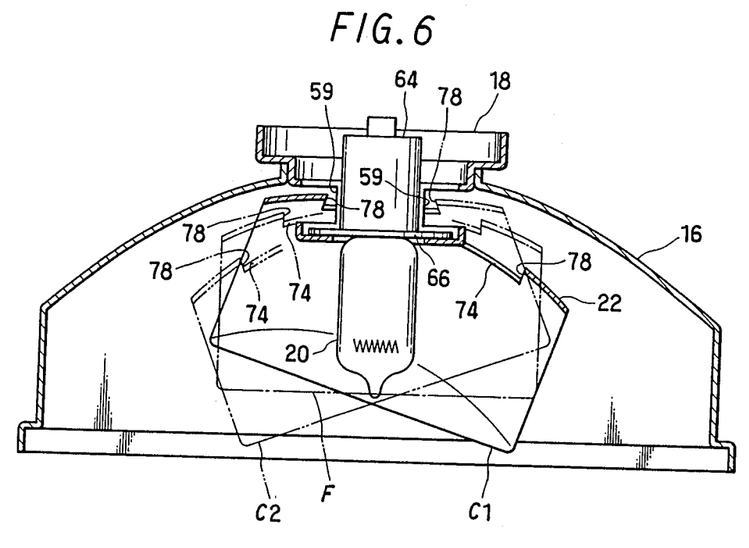
FIG. 6 is an enlarged horizontal sectional view of the fixed and movable reflectors, light bulb, and bulb holder of the lamp assembly, the view being explanatory of the fog lamp position and two cornering lamp positions to be occupied by the movable reflector in the use of the lamp assembly.

As illustrated in FIG. 6, the movable reflector 22 is pivotable between the fog lamp position F and either of the two cornering lamp positions C1 and C2. When the movable reflector 22 is in the fog lamp position F, its optical axis (i.e. the axis of the paraboloid of revolution formed by its reflective portion 68) agrees with the optical axis of the fixed reflector 16 (i.e. the axis of the paraboid of revolution formed by its reflective portion 36). Consequently, the fixed and movable reflectors 16 and 22 conjointly produce parallel rays of light from the bulb 20 that are directed forwardly of the lamp assembly 10. This lamp assembly may therefore be used as fog lamp when the movable reflector 22 is in the fog lamp position F.

When the movable reflector 22 is pivoted to either of the two cornering lamp positions C1 and C2, its axis becomes angled with respect to the fixed reflector axis. In this cornering lamp position the movable reflector 22 will reflect part of the light rays from the bulb 20 in the direction of its angled axis whereas the fixed reflector 16 will remain directing the remainder of the light rays in the direction of its own axis, that is, forwardly of the lamp assembly 10. Thus, when the motor vehicle is to make a turn, the movable reflector 22 may be pivoted from the fog lamp position F to the required one of the two possible cornering lamp positions C1 and C2 for expanding the range of illumination in the direction of the vehicle turn, thereby causing the lamp assembly 10 to serve the additional purpose of cornering lamp.

It will also be observed from FIG. 6 that one of the vertical edges 78 of the movable reflector 22, bounding the aperture 74, is received in the associated one of the pair of recesses 59 in the bulb holder 18 when the movable reflector is pivoted to either of the cornering lamp positions C1 and C2.

Drive Mechanism

The drive mechanism 24 operates to pivot the movable reflector 22 between its fog lamp position F and either of the two cornering lamp positions C1 and C2. Broadly, the drive mechanism 24 comprises a drive assembly 120 for providing bidirectional driving torque, and a drive linkage 122 for transmitting the driving torque of the drive assembly to the movable reflector 22 to cause its pivotal motion between the fog lamp position F and either of the two cornering lamp positions C1 and C2.

Figure 7:
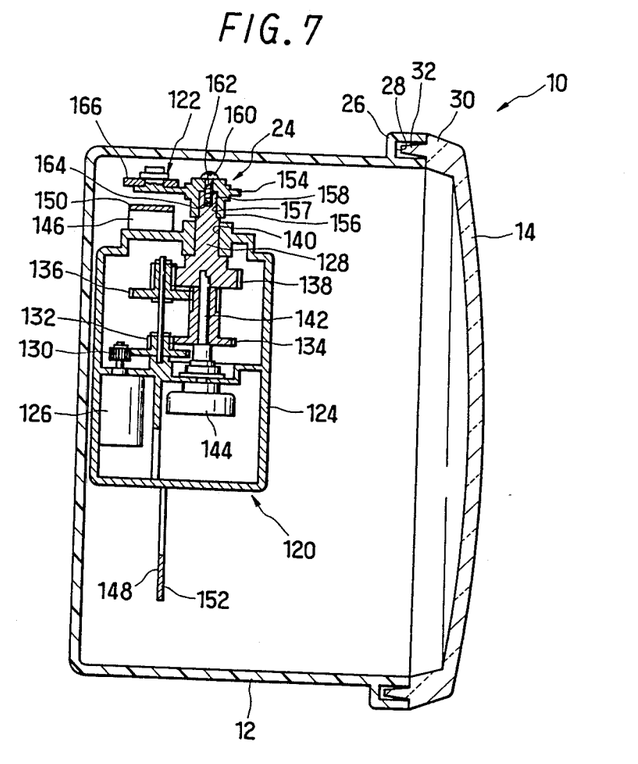
FIG. 7 is a vertical section through the lamp assembly, taken along the line VII—VII in FIG. 1 and showing in particular the drive assembly for moving the movable reflector between the fog lamp position and cornering lamp positions.

FIG. 7 best illustrates that the drive assembly 120 has an enclosure 124 which is disposed within the lamp housing 12 and on one side of the fixed reflector 16. Mounted upstandingly within the enclosure 124 is a reversible electric drive motor 126 which is coupled to the output shaft 128 of the drive assembly 120 via speed reduction means comprising gears 130, 132, 134, 136 and 138. The output shaft 128 extends upwardly of the enclosure 124 via a hole 140 formed therein for connection to the movable reflector 22 via the drive linkage 122.

Coaxially coupled to the output shaft 128 of the drive assembly 120 is a rotor shaft 142 of an angle sensor 144 disposed within the drive assembly enclosure 124. The angle sensor 144 responds to the bidirectional rotation of the drive assembly output shaft 128 for detecting the angle of rotation, or angular position, of the movable reflector 22.

Figure 1:
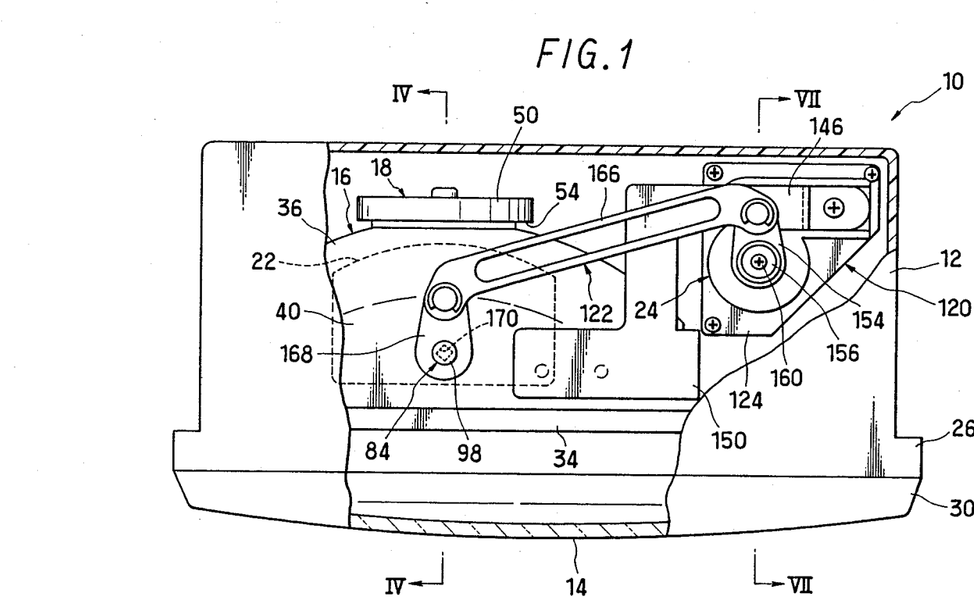
FIG. 1 is a top plan of a combined fog and cornering lamp assembly for vehicular use embodying the principles of the invention, with the housing of the lamp assembly shown broken away to reveal the parts contained therein.

As will be seen also from FIGS. 1 and 2, the drive assembly enclosure 124 is immovably supported between arms 146 and 148 of mounting brackets 150 and 152 secured to the flat top and bottom portions 40 and 42 of the fixed reflector 16.

Included in the drive linkage 122 is a first drive arm 154 rigidly coupled at one end to the output shaft 128 of the drive assembly 120 so as to extend right angularly therefrom. As will be understood by referring again to FIG. 7, the first drive arm 154 has an upstanding boss 156 formed in one npiece therewith. The boss 156 has a hole 157 of polygonal cross sectional shape extending upwardly from its bottom end for nonrotatably receiving an upward extension 158 of matching cross sectional shape formed coaxially on the drive assembly output shaft 128. A screw 160 is inserted in and through a clearance hole 162 in the boss 156 and is threadedly engaged in a tapped hole 164 in the extension 158 of the drive assembly output shaft 128. Thus the first drive arm 154 is firmly coupled at one end to the drive assembly output shaft 128 in right angular relation thereto.

The free end of the first drive arm 154 is pin jointed to one end of a drive link 166, the outer end of which is likewise jointed to one end of a second drive arm 168, as illustrated in both FIGS. 1 and 4. The second drive arm 168 has a hole 170 of square shape formed in its other end for nonrotatably receiving the upward extension 98 of the upper pivot pin 84 which rotatably extends upwardly from the flat top portion 40 of the fixed reflector 16 and which is coupled to the movable reflector 22 for joint rotation therewith. The pivot pin extension 98 is clinched to provide an enlarged head for preventing the detachment of the second drive arm 168 therefrom.

Operation

The movable reflector 22 of the combined fog and cornering lamp assembly 10 may be held in the fog lamp position F, with the drive linkage 122 in the state of FIG. 1, when the vehicle is traveling straight. When in the fog lamp position F, the movable reflector 22 will coact with the fixed reflector 16 to reflect the light from the bulb 20 forwardly of the vehicle.

If the vehicle driver turns the steering wheel in either direction to steer the vehicle, an electric control circuit, not shown, will automatically respond to such turn of the steering wheel by causing energization of the drive motor 98, FIG. 5, of the drive assembly 92 in a direction corresponding to the direction of the vehicle turn. The consequent rotation of the drive motor 98 will be transmitted to the drive assembly output shaft 128 via the reduction gears 130, 132, 134, 136 and 138. The drive linkage 122 will transmit the resulting rotation of the drive assembly output shaft 128 to the movable reflector 22, causing the same to pivot from the fog lamp position F to the required one of the two cornering lamp positions C1 and C2.

As has been set forth in connection with FIG. 6, one of the two parts of the movable reflector 22 which are located on the opposite sides of the aperture 74 will be received in the associated one of the two recesses 59 in the bulb holder 18 upon displacement of the movable reflector to either of the cornering positions C1 and C2. Accordingly, for a given angular spacing between the two cornering positions C1 and C2, the horizontal dimension of the aperture 74 can be much smaller than if the bulb holder 18 had no such constricted neck, as has been the case heretofore.

The fact that the movable reflector 22 has been pivoted to the desired cornering lamp position will be detected by the angle sensor 144, FIG. 7, built into the drive assembly 120. As the rotor shaft 142 of the angle sensor 144 rotates with the drive assembly output shaft 128, the angle sensor 144 will provide a voltage signal representative of the angle of rotation of the drive assembly output shaft and, in consequence, of the movable reflector 22. The unshown control circuit will respond to the output from the angle sensor 144 by deenergizing the drive motor 126 when the magnitude of the drive sensor output reaches a predetermined or other desired value. Thus pivoted to the desired cornering lamp position, the movable reflector 22 will throw part of the light rays from the bulb 20 along its axis which is now angled toward either side of the vehicle, thereby providing additional road illumination in the direction of the vehicle turn.

Then, as the steering wheel is manipulated back to the normal position after the vehicle has completed the turn, the control circuit will cause excitation of the drive motor 98 in the reverse direction. The drive mechanism 24 will then return the movable reflector 22 from the cornering lamp position C1 or C2 back to the fog lamp position F. The control circuit will set the drive motor 98 out of rotation when the output voltage of the angle sensor 144 indicates that the movable reflector 22 is in the fog lamp position.

Various modifications and alternations of the illustrated embodiments may be made in order to conform to design preferences or to the requirements of each specific application of the invention, without departing from the fair meaning or proper scope of the following claims.

WHAT IS CLAIMED IS:

1. A dual purpose lamp assembly for use, for example, as a combined fog and cornering lamp on a motor vehicle, the lamp assembly comprising:
   (a) a fixed reflector oriented forwardly of the lamp assembly;
   (b) a bulb holder mounted to the fixed reflector so as to extend forwardly therefrom;
   (c) a light bulb supported by the bulb holder and generally extending forwardly therefrom;
   (d) a movable reflector, smaller than the fixed reflector, disposed forwardly of the fixed reflector and having an aperture formed therein to permit the bulb holder to extend therethrough so that the light bulb is positioned forwardly of the movable reflector, the movable reflector being pivotable about a predetermined axis relative to the fixed reflector between a first position, where the movable reflector coacts with the fixed reflector for reflecting the light rays from the bulb forwardly of the lamp assembly, and a second position where the movable reflector reflects part of the light rays from the bulb toward one side of the lamp assembly;

(e) the bulb holder having a constricted neck for receiving part of the movable reflector as the latter pivots between the first and second positions;

(f) whereby the dimension of the aperture in the movable reflector can be reduced to a minimum in a direction at right angles with the predetermined axis without interfering with the pivotal motion of the movable reflector.

2. The dual purpose lamp assembly of claim 1 wherein the bulb holder is substantially tubular in shape with an end plate closing its front end located forwardly of the movable reflector, the end plate having an opening through which extends the light bulb, wherein the light bulb has a stem received within the bulb holder and a mounting flange formed on the bulb stem and held against the end plate of the bulb holder, and wherein the constricted neck of the bulb holder is located behind the mounting flange of the bulb.

3. A combined fog and cornering lamp assembly readily adaptable for installation on either side of a motor vehicle, the lamp assembly comprising:

(a) a housing having an open front end;

(b) a lens closing the front end of the housing;

(c) a fixed reflector fixedly mounted within the housing and oriented forwardly of the housing;

(d) a substantially tubular bulb holder mounted to the fixed reflector and extending forwardly therefrom;

(e) a light bulb supported by the bulb holder and generally extending forwardly therefrom;

(f) a movable reflector, smaller than the fixed reflector, disposed forwardly of the fixed reflector and having an aperture formed therein to permit the bulb holder to extend therethrough so that the light bulb is positioned forwardly of the movable reflector, the movable reflector being normally held in a fog lamp position for reflecting the light rays from the light bulb in the forward direction of the lamp assembly in coaction with the fixed reflector, the movable reflector being pivotable about a vertical axis from the fog lamp position to either of two cornering lamp positions, which are angularly displaced from the fog lamp position toward both sides of the lamp assembly, for reflecting part of the light rays from the source toward the opposite sides of the lamp assembly; and (g) drive means for pivoting the movable reflector between the fog lamp position and either of the cornering lamp positions;

(h) the movable reflector having a constricted neck for receiving parts of the movable reflector as the latter pivots from the fog lamp position to ether of the two cornering lamp positions;

(i) whereby the horizontal dimension of the aperture in the movable reflector can be reduced to a minimum without interfering with the pivotal motion of the movable reflector.

4. The combined fog and cornering lamp assembly of claim 3 wherein the constricted neck of the bulb holder is formed by a pair of recesses disposed in diametrically opposite positions on the bulb holder.

* * * * *